(12) United States Patent
Ptasinski et al.

(10) Patent No.: US 9,983,354 B1
(45) Date of Patent: May 29, 2018

(54) COMPLEMENTARY PLASMONIC DEVICE AND METHOD

(75) Inventors: Joanna Ptasinski, San Diego, CA (US); Stephen Russell, San Diego, CA (US)

(73) Assignee: The United States of America, as Represented by the Secretary of the Navy, Washington, DC (US)

(*) Notice: Subject to any disclaimer, the term of this patent is extended or adjusted under 35 U.S.C. 154(b) by 1701 days.

(21) Appl. No.: 12/100,512

(22) Filed: Apr. 10, 2008

(51) Int. Cl.
*G02B 6/34* (2006.01)
*G02B 6/122* (2006.01)

(52) U.S. Cl.
CPC .................................. *G02B 6/1226* (2013.01)

(58) Field of Classification Search
None
See application file for complete search history.

(56) References Cited

U.S. PATENT DOCUMENTS

| | | | |
|---|---|---|---|
| 4,451,123 A * | 5/1984 | McNeill et al. | 359/263 |
| 5,570,139 A * | 10/1996 | Wang | 348/744 |
| 5,986,808 A * | 11/1999 | Wang | 359/585 |
| 6,384,953 B1 | 5/2002 | Russell et al. | |
| 6,646,782 B1 | 11/2003 | Russell et al. | |
| 6,667,807 B2 * | 12/2003 | Lieberman | 356/445 |
| 6,738,194 B1 | 5/2004 | Ramirez et al. | |
| 6,753,994 B1 | 6/2004 | Russell | |
| 6,782,179 B2 * | 8/2004 | Bozhevolnyi et al. | 385/131 |
| 7,039,315 B2 * | 5/2006 | Blumberg et al. | 398/49 |
| 7,170,142 B2 | 1/2007 | Wojcik et al. | |
| 7,447,396 B2 * | 11/2008 | Hyde et al. | 385/16 |
| 2003/0169958 A1 * | 9/2003 | Ridgway et al. | 385/14 |
| 2005/0058425 A1 * | 3/2005 | Berini et al. | 385/147 |
| 2005/0270538 A1 * | 12/2005 | Meehan et al. | 356/445 |
| 2005/0285128 A1 * | 12/2005 | Scherer et al. | 257/98 |
| 2008/0212923 A1 * | 9/2008 | Hyde et al. | 385/16 |

* cited by examiner

*Primary Examiner* — Chris Chu
(74) *Attorney, Agent, or Firm* — SSC Pacific Patent Office; Arthur K. Samora; Kyle Eppele

(57) ABSTRACT

Methods and devices for a plasmonic circuit are described. A planar plasmonic device is configured with a controlling gate structure and when coupled to a complementary plasmonic device, a switching circuit can be realized. Also, by varying the properties of the complementary plasmonic device, the circuit can also operate as an amplifier. By use of combinations of this plasmonic circuit element, more advanced circuits and logic functions can be arrived at.

5 Claims, 3 Drawing Sheets

COMPLEMENTARY PLASMONIC DEVICE AND METHOD

This (Navy Case No. 98783) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice 619-553-2778; email T2@spawar.navy.mil.

BACKGROUND OF THE INVENTION

Field

This disclosure is related to plasmonics. More particularly, this disclosure is related to surface plasmon devices configured to form a signal controlling structure.

Background

Plasmonics is a field where one exploits the short wavelength of a surface plasmon for information transfer or data manipulation, much like the manner in which an optical wavelength can be exploited for information transfer or data manipulation. There are well known methods of performing this coupling such as prism coupling using total internal reflection using a high index prism on a metal layer, grating coupling or aperture coupling. U. S. Pat. No. 6,646,782, which issued to Russell et al. for an invention entitled "Solid State Surface Plasmon Light Valve and Tunable Filter", is one example that describes a tunable optical filter using such a system. However, rather than a quantum of light (a photon), a plasmon, or collective excitation in the electron density, is used. The manner of use is described more fully below.

However, since this field is nascent in many respects, there are not yet any basic components using plasmonics that can function as a building blocks for more advanced devices or systems, particularly for logic operations. Accordingly, there has been a long-standing need in the community for basic plasmonic devices or systems, which can be used as building blocks for more advanced systems.

SUMMARY

The foregoing needs are met, to a great extent, by the present disclosure, wherein methods and systems are provided that in some embodiments complementary plasmonic devices are used to provide a signal controlling element. By using the structure of the complementary plasmonic device, various logic or signal controlling "components" can be constructed to enable the building of more advanced signal controlling or logic controlling devices.

In accordance with an aspect of the present disclosure, a complementary plasmonic circuit is provided, comprising: an electro-optic substrate; a plasmon supporting layer disposed in the substrate; a control coupled to the supporting layer; a first plasmonic device coupled to the supporting layer, the first plasmonic device having an input; a second plasmonic device coupled to the supporting layer, the second plasmonic device having an input; and a circuit output coupled to at least one of the first and second plasmonic devices, wherein an output from the first plasmonic device and an output from the second plasmonic device is controllable by a signal from the control.

In accordance with one aspect of the present disclosure, a method for fabricating a complementary plasmonic device is provided, comprising: forming a plasmon supporting layer on an electro-optic substrate; forming a first plasmonic device layer on the supporting layer, the firs plasmonic layer having a first input and a first output; forming a second plasmonic device layer on the supporting layer, the second plasmonic device having a second input and a second output; and, forming a controlling gate on the electro-optic substrate that is capable of jointly influencing a plasmonic property of the first and second plasmonic devices; and forming a device output that is coupled to the first and second outputs of the first and second plasmonic device layers.

In accordance with yet another aspect of the present disclosure, a method for generating a complementary plasmonic circuit output includes the steps of: inputting a first optical signal into a first plasmonic device disposed on a substrate. A second optical signal is input into a second plasmonic device is similarly disposed on the substrate, substantially adjacent to the first plasmonic device. The first and second plasmonic devices have first and second respective outputs, and the method further includes controlling a response of the first and second plasmonic devices (the first and second outputs) via a signal that is fed to a control gate common to each of the first and second plasmonic devices. A third optical signal is output from at least one of the first and second plasmonic devices based on the control gate signal.

DETAILED DESCRIPTION OF THE EMBODIMENTS

Figure 1:
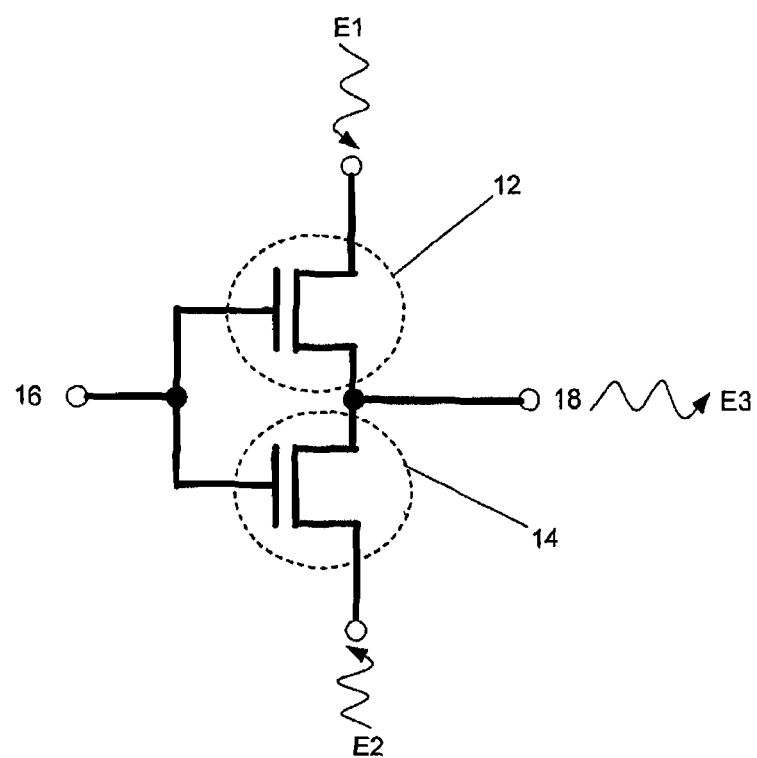
FIG. 1 is a circuit schematic diagram of an exemplary complementary plasmonic device, according to an embodiment of this disclosure.

The claimed subject matter is now described with reference to the drawings, wherein like-referenced numerals are used to refer to like-referenced elements throughout. In the following description, for purposes of explanation, numerous specific details are set forth in order to provide a thorough understanding of the claimed subject matter. It may be evident, however, that such subject matter may be practiced without these specific details.

In brief overview, rather than modulating a quantum of light (a photon), a plasmon, or collective excitation in the electron density of a material, can be used for signal control. One can control the resonance of the surface plasmon by varying the effective dielectric constant of the constituent material. From first principles, one may couple light into a thin layer of metal at a metal-dielectric interface to form a surface plasmon under specific coupling conditions, given by:

$$k_{sp} = k\left(\frac{\varepsilon_m \varepsilon_d}{\varepsilon_m + \varepsilon_d}\right)^{1/2} = \frac{\omega}{c}\sqrt{\varepsilon_d}\sin\theta$$

where $k_{sp}$ is the wave number of the surface plasmon, k is the wave number of the incident light, $\varepsilon_m$ is the permittivity of the metal, $\varepsilon_d$ is the permittivity of the dielectric, ω is the plasma frequency, c is the speed of light in a vacuum, and θ is the angle of incidence.

In view of the above relationship, it is proposed that by using a pair of high-speed three terminal plasmonic devices configured to operate in a complementary manner, one device can be turned "on" while an adjacent device can be turned "off," resulting in a plasmonic structure capable of being used as logic-like or signal controlling device.

One of several possible methods to form such a plasmonic structure is to form a suitable metal or highly conductive layer on a suitable electro-optic substrate which is capable of supporting surface plasmons. The layer becomes the effective "waveguide" for the surface plasmon. The plasmonic device is configured with an input coupling region for the incoming signal light (analogous to the source in a transistor), a layer through which the surface plasmon propagates at the interface of the electro-optic material (analogous to the channel of a transistor), and an output coupling region for an outgoing signal (analogous to the drain of a transistor). Of course, it should be appreciated that depending on the kind of transistor-type analogy being made, the source and drain references may be reversed.

The electro-optic substrate may also have control electrodes appropriately placed on or operably coupled to the substrate and/or the layer, effectively forming the gate function found in a transistor. The control electrodes may be in a parallel configuration, adjacent configuration, cascaded configuration, or operably-coupled configuration with respect to the "waveguide" layer that supports the plasmons. By applying a signal, for example, a voltage to the control electrodes, one can vary the electro-optic properties of the substrate and/or layer and therefore change the resonance frequency of the surface plasmon. In various embodiments, one or more of the control electrodes may be connected to a photodetector such as, for example, a photodiode or phototransistor so that a high speed light pulse can be used to generate a high speed voltage pulse to control the plasmonic device.

Alternately, since light of a suitable wavelength can be absorbed in the electro-optic substrate to, in turn, change the electro-optic properties of the substrate, a control "light" or pulse may be used to perform the gating function, rather than a voltage. Further, piezoelectric mechanisms can be used, depending on the mechanical-optic properties of the substrate and/or layer to arrive at the same gating function capability. From the above description, it should be appreciated that this control pulse can originate from any one or more of an electrical, optical, mechanical, acoustical, or some other means to operate as the third terminal in the device which affects the surface plasmon. Since the control pulse can change the resonant frequency, it may be used to "turn-off" or inhibit the propagation of a surface plasmon, therefore acting as a switch.

FIG. 1 is an illustration of a circuit schematic of an exemplary complementary structure 10, according to an embodiment of this disclosure. The exemplary complementary structure 10 contains multiple three-terminal plasmonic devices 12 and 14, connected in a manner to share an input 16 and an output 18. For the sake of simplicity, FIG. 1 illustrates the plasmonic devices 12 and 14 in terms of field-effect transistor (FET) schematic symbology, to connote three-terminal devices. Of course, any other schematic symbology, whether three-terminal or otherwise, may be used as deemed appropriate, as well as configuring more than two plasmonic devices.

In the exemplary embodiment illustrated in FIG. 1, one surface plasmon device 12 would be in a normally-on configuration and a control pulse emanating from the input 16 would turn it off by changing the resonant frequency. A second plasmonic device 14 is operably connected, in a normally off configuration, and if acted upon by the control pulse would shift the surface plasmon resonance so that it propagates to the output coupler 18. The pair of plasmonic devices 12 and 14 are oriented or operably connected such that one control pulse from the input 16 can control both plasmonic devices 12 and 14, in a simultaneous or near simultaneous manner. As illustrated in FIG. 1, E1 and E2 are used to symbolize the incident electromagnetic waves on each of the plasmonic devices 12 and 14, respectively, and E3 denotes the output electromagnetic wave as dictated by the control pulse.

It should be appreciated that in various embodiments, it may be possible to reverse the biasing or "on/off" assignments for the plasmonic devices 12 and 14 depending on the type of configuration desired. For example, in some embodiments, it may be desired to have the second plasmonic device 14 as the "on" device, while having the first plasmonic device 12 as the "off" device. Accordingly, the designation of "on" or "off" is implementation-dependent and, therefore, such variations are within the spirit and scope of this disclosure.

Other forms and/or methods for "directing" surface plasmons may now be contemplated. For example, in various exemplary embodiments, multiple metal regions or layers can be patterned that can direct the surface plasmon into a region that supports only surface plasmons of a desired frequency. Accordingly, an output or outputs of the plasmonic device can have different states or values associated with the respective supported frequencies, to provide a multi-state control device.

Figure 2:
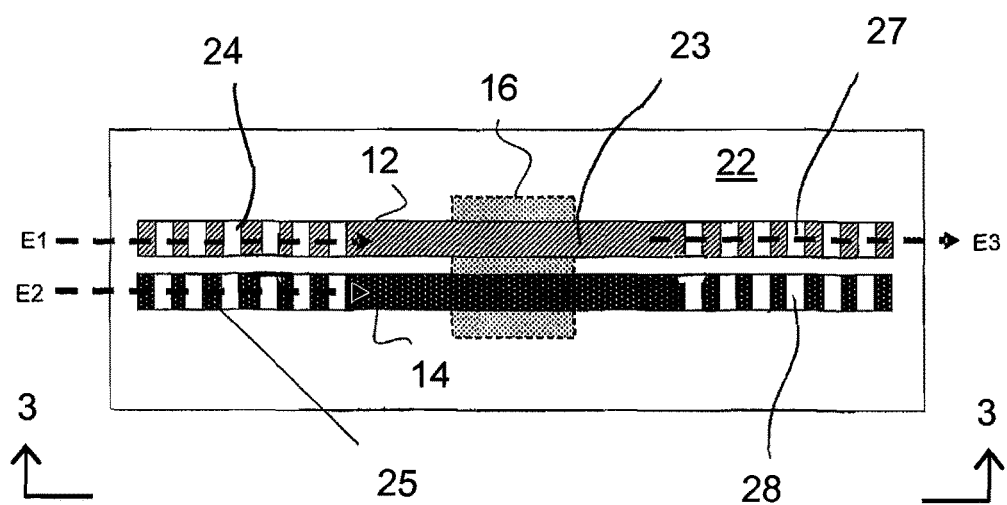
FIG. 2 is a top plan view of an exemplary plasmonic device, according to an embodiment of this disclosure.

FIG. 2 is a top plan view of an exemplary complementary plasmonic device 20, where electro-optic substrate 22 supports the aforesaid plasmonic devices 12 and 14, which are controlled by a single input "control gate" 28 formed on the opposing (bottom) side of the electro-optic substrate 22. The control gate 28 may be connected to a controlling source (not shown), which may or may not be proximate substrate 22, and control gate 28 may have the control signal generated by an optical, electrical, acoustical, or other means as desired. The notations E1 and E2 correspond to the incident electromagnetic waves at different frequencies on each of the plasmonic devices 12 and 14, respectively, and E3 denotes the output electromagnetic wave determined by the control pulse. It should be noted, that for illustrative purposes only, E3 is shown as emanating from plasmonic device 12. Of course, depending on the operational mode, E3 may be emanating from plasmonic device 12, from plasmonic device 14, or not at all, according to the input received from control gate 28.

Figure 3:
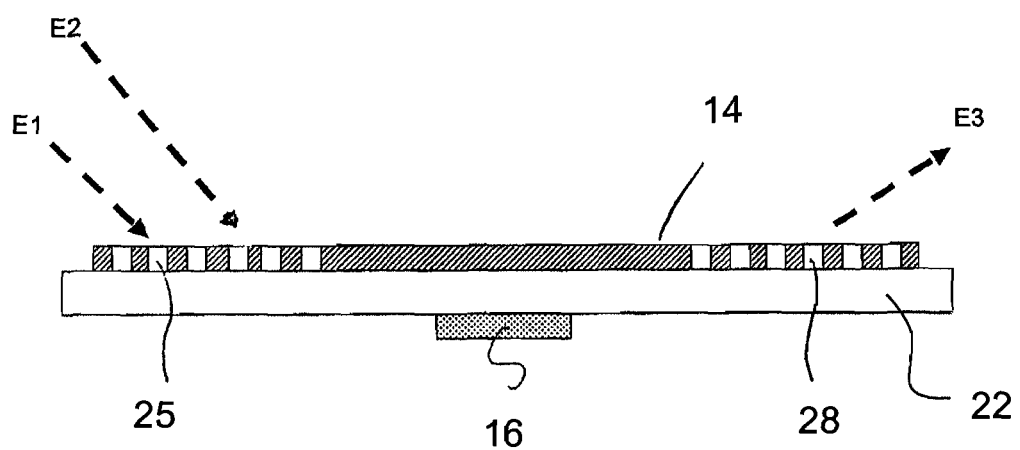
FIG. 3 is a cross-sectional side view of an exemplary plasmonic device, according to an embodiment of this disclosure when viewed along the plane 3-3 in FIG. 2.

As can be seen in FIGS. 2 and 3, each plasmonic device 12 and 14 formed on the top side of the electro-optic substrate 22 contains respective input grating couplers 24, 25, and output grating coupler 27, 28, as well as a region 23 where a surface plasmon may propagate in a guided manner. The input and output grating couplers 24, 25, 27 and 28 facilitate the coupling of light into and out of plasmonic devices in a manner know in the art, and the depth and width of the notches in the grating are chosen according to the properties of the plasmonic device and the angle of incidence of electromagnetic light waves E1, E2 or E3 on plasmonic devices 12, 14. The frequency of the surface plasmon is governed by the dielectric constant of the material of the electro-optic substrate 22 (which can be dependent on any one of voltage, mechanical, optical, etc.), and the complex dielectric properties of the control gate's 28 composition. Different materials can be used to design the desired effect, where for a given control parameter on the control gate 28 one plasmonic device is on (for example, E1 is incident on plasmonic device 12) and its light can be coupled, for example, as E3, and in a desired time period later the control parameter can change and the light from the other plasmonic device (for example, E2 is incident on plasmonic device 14) may be alternatively coupled out. It should be appreciated that while FIG. 2 illustrates the inputs of the plasmonic devices 12 and 14 as having a grating coupler, other forms of couplers, interfaces (such as prism couplers and aperture couplers, for example); other controlling structures may be used to accomplish the spirit and scope of this disclosure.

As an illustrative example, presume a surface plasmon of resonant frequency $\omega_1$ has been created in a layer, for example silver, at 1.5 µm and the output light is at $\lambda_1$ at one control signal value. Then changing the control signal value can take a surface plasmon of resonant frequency $\omega_2$ propagating in another layer, for example, aluminum, at 0.5µm and then output the light at $\lambda_2$. What is effectively accomplished, is to simultaneously change the resonant frequency of each of the surface plasmons coupled into the plasmonic devices by use of the control pulse to couple a desired light-wave out. Therefore, by staging multiple plasmon devices having different characteristics with a single or multiple control gate, the emission of different frequencies of light, individually or in combination, can be controlled.

Further, while the use of a "different" plasmonic device is contemplated to produce different emission qualities, the ability to produce different emissions from the plasmonic device may also be achieved by affecting the properties of the gate region that is controlling the complementary plasmonic device. That is, rather than adjusting the physical properties of the complementary plasmonic device, the control gate's physical properties may be adjusted to be "different" for one plasmonic device versus the other plasmonic device. Specifically, a region of the control gate that affects one plasmonic device may have a different capability than another region of the control gate that affects the other plasmonic device. Accordingly, a non-homogeneous gate 28 may be used to arrive as a similar result.

It should be apparent that based on the description provided herein, complementary or a plurality of differing plasmonic devices can be coupled to a single or even multiple control gates to enable the control and emission of more than one light signal or plasmonic emission. Thus, a plasmonic device having multiplexing or demultiplexing capabilities can be constructed. Further, it should be appreciated that such a device can be used for switching and/or gating other devices.

FIG. 3 is a cross-sectional side view of the exemplary plasmonic device taken along plane 3-3 in FIG. 2. It should be noted that in this side view, one of the plasmonic devices is obstructed from view. In this embodiment, it is clear that the control gate 28 is disposed on the "opposite" side of the substrate 22 as the plasmonic devices 12 and 14. However, as mentioned above, in various embodiments it may be possible to configure the control gate 28 to be disposed on the "same" side of the plasmonic devices 12 and 14, according to design preference.

It should be appreciated that while the exemplary embodiments shown in FIGS. 2-3 illustrate the plasmonic devices as being co-planar to each other and on the surface of the substrate, it is possible, given the capabilities of 3-dimensional fabrication schemes, to fabricate plasmonic devices that are embedded in the substrate and disposed in a non-coplanar configuration, depending on design considerations and performance requirements.

Additionally, lens devices or apertures, as non-limiting examples, may be accommodated in the substrate to enable the embedding of plasmonic devices within a substrate, rather than on the substrate, while enabling photonic access to the plasmonic device via the lens device or aperture. Therefore, the configuration of 3-dimensionally disposed plasmonic devices are within the spirit and scope of this disclosure. Further, while FIGS. 2-3 illustrate the exemplary plasmonic devices' structure as being uniform in shape, alternative structures that are non-uniform in shape may be devised. For example, other embodiments might plasmonic devices having a non-linear taper or offset or other characteristic-altering feature may be implemented without departing from the spirit and scope of this disclosure.

Numerous advantages can now be realized by implementation of the exemplary embodiments described herein. For example, based on the configuration of the plasmonic devices, the design of a plasmonic device architecture can be developed very much like the manner in which different transistor configurations are used to design a semiconductor device. Additionally, a plurality of plasmonic devices can be controlled simultaneously.

Further, since it is known that plasmons are lossy, the exemplary embodiments provide the advantage that they do not require that the surface plasmon be sustained over a long distance (that is, on the order of a centimeter or more) and, therefore, practical applications in plasmonic circuits, which heretofore have not been realized, can be pursued. That is, because the surface plasmon need only exist over a small region, it may be switched between multiple states and subsequently detected. Another advantage is that the surface plasmon wavelength is shorter than light so the effective active area of the device can be smaller than the wavelength of light, resulting in smaller devices than currently employed in the semiconductor arts.

It should be appreciated, that one may also use elements or compounds comprising Al, Au, Rh—Al metallic alloys and other highly conductive materials for supporting the surface plasmon. Typically, there are advantages for using metals that will produce a narrow plasmon resonance such as, for example, Ag, since one can switch between the digital one state and zero state very easily. Conversely, a broadband resonance response from metals, such as, for example, Rh—Al, may be able to produce an analog output (by varying intensity) rather than a digital response. It should also be appreciated, that one may also incorporate and operatively connect elements or devices such as erbium-doped optical amplifiers, enabling the operation of such a device to act similarly, for example, to an amplifier.

One could, in principle, form mixed-signal (analog and digital) plasmonic devices on the same substrate by patterning different metal layers, provided the layers are side-by-side. Consequently, a hybrid plasmonic device may be constructed. Additionally, by using a series or sets of plasmonic devices, the construction of what would be analogous to complex logical devices having complementary transistor devices may be achieved, where one could activate one device 12 and deactivate another 14. By combining such devices on-chip, reductions in on-chip "real-estate" can be realized to form compact plasmonic circuits and components.

Also, one may choose to integrate a light source onto the plasmonic device for effective coupling using photonic silicon devices such as disclosed in Russell et al., U.S. Pat. No. 6,093,941 entitled "Photonic Silicon on a Transparent Substrate" (issued 25 Jul. 2000), or other semiconductor or organic light emitting structures or nanostructures. Alternately, externally formed and operably coupled photonic devices may be integrated in a common package to the plasmonic device. Also, confinement structures using photonic bandgap technology may be incorporated, as desired, to improve isolation between plasmonic devices to avoid "cross-talk" or unintended switching of adjacent devices.

It will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A complementary plasmonic three-terminal transistor circuit, comprising:
    an adiabatic electro-optic substrate;
    a control coupled to the substrate, said control being selected from the group consisting of voltage control and light control;
    a first metallic strip coupled to the substrate to establish a first plasmonic device having a first metal-dielectric interface, the first plasmonic device receiving incident electromagnetic waves on said first metallic strip and having a first plasmonic output that propagates along said first metal dielectric interface at a first plasmonic frequency $\omega_1$;
    a second metallic strip coupled to the substrate to establish a second plasmonic device having a second metal-dielectric interface that is coplanar with said first metal-dielectric interface, the second plasmonic device receiving said incident electromagnetic waves on said second metallic strip, said electromagnetic waves and having a second plasmonic output that propagates along said second metal dielectric interface at a second plasmonic frequency $\omega_2$; and,
    a gate circuit output coupled to at least one of the first and second plasmonic devices, wherein the first output and the second output are simultaneously controllable by the same control to yield the circuit output.

2. The circuit according to claim 1 wherein said control has a signal, wherein the first source and second drain plasmonic devices possess substantially different signal propagation properties, and wherein the second drain plasmonic device is configured to respond differently from the first source plasmonic device to said signal from the control.

3. The circuit according to claim 2, wherein at least one of the first source and second drain plasmonic devices contains an aperture coupler.

4. The circuit according to claim 2, wherein the first source and second drain plasmonic devices are disposed substantially coplanar to each other.

5. The circuit according to claim 2, wherein the control is disposed on an opposite side of the substrate from the first source and second drain plasmonic devices.

* * * * *